INVENTOR.
GORDON W. HERZOG

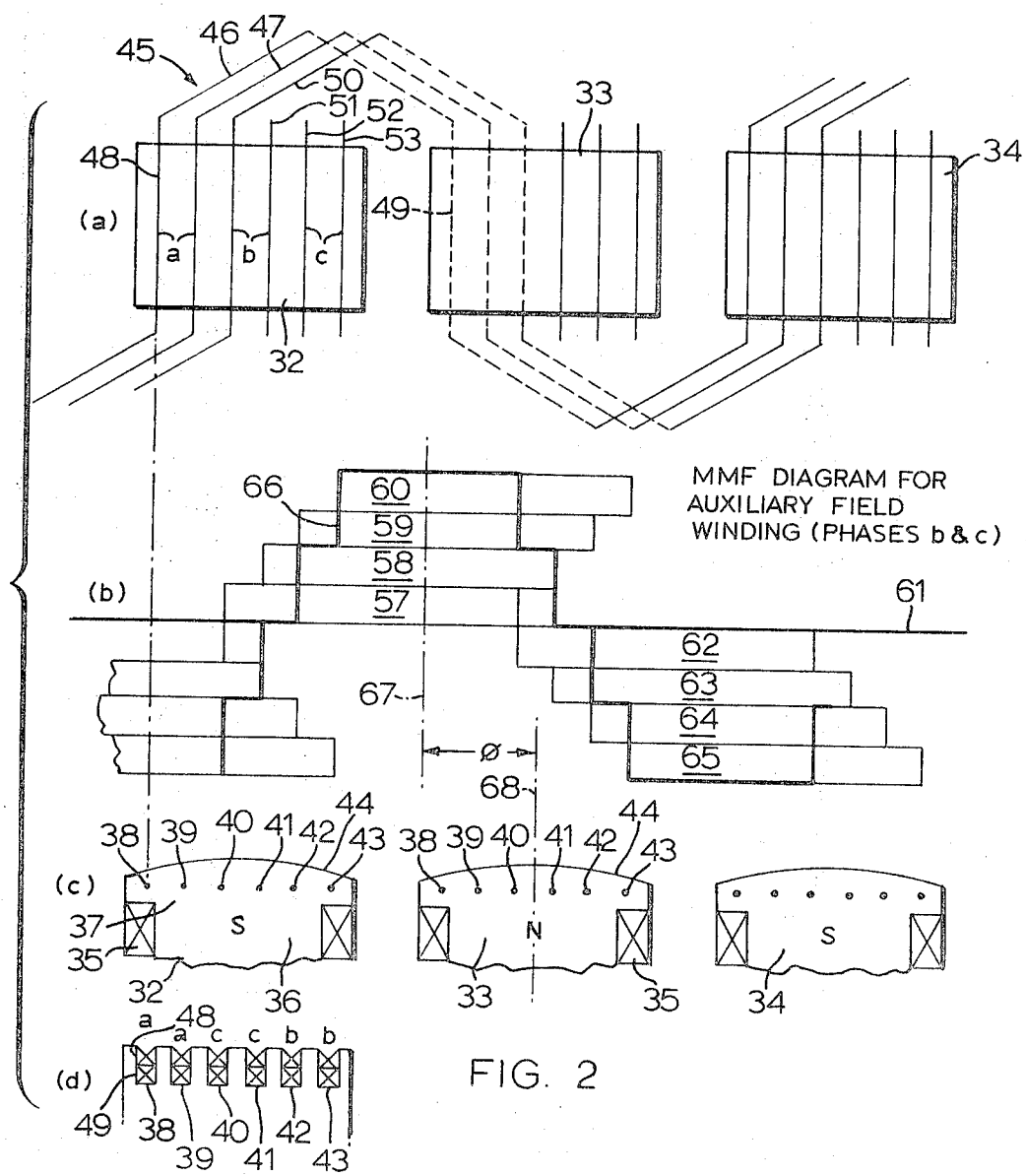
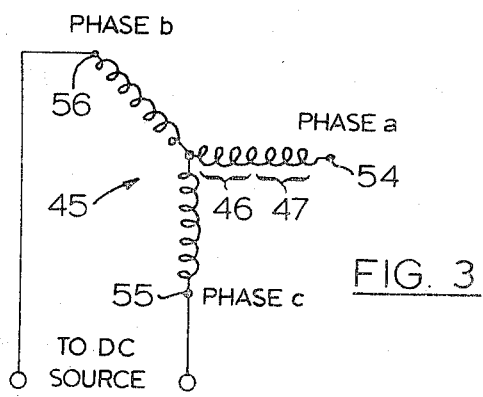
FIG. 3
INVENTOR.
GORDON W. HERZOG
BY
ATTORNEY

LEGEND, FIGS. 4, 5 & 6

ITEMS 70, 71, 72 & 73 ARE CURRENT COLLECTORS (SLIP RINGS).

ITEMS 74, 75, 76 & 85 ARE NORMALLY CLOSED CONTACTS OF A CONTACTOR.

ITEMS 77, 78, 79 & 86 ARE NORMALLY OPEN CONTACTS OF A CONTACTOR.

INVENTOR.
GORDON W. HERZOG

BY

ATTORNEY

United States Patent Office 3,553,552
Patented Jan. 5, 1971

3,553,552
FIELD WINDING FOR SYNCHRONOUS MOTORS
Gordon William Herzog, Peterborough, Ontario, Canada, assignor to Canadian General Electric Company, Limited, Toronto, Ontario, Canada, a corporation of Canada
Filed Sept. 19, 1969, Ser. No. 859,329
Claims priority, application Canada, July 17, 1969, 57,313
Int. Cl. H02p 1/50
U.S. Cl. 318—183                                13 Claims

ABSTRACT OF THE DISCLOSURE

A synchronous motor comprises a stator and a rotor, one of which has an armature core and the other a field core; an armature winding on the armature core for producing a rotating magnetic field winding on the field core for producing a multi-polar steady state magnetic field when energized with direct current; an auxiliary winding on said field core displaced with respect to said main winding such that when energized with direct current it produces a second multi-polar steady state magnetic field having polar axes displaced with respect to the polar axes of said main field and when connected to resistor means it provides secondary winding turns for the armature winding. The auxiliary winding is connected to a direct current source of the resistor means. The relative values of the direct current applied to said main and auxiliary windings are varied.

---

This invention relates to field windings for synchronous motors.

Applicant's copending application for patent. Ser. No. 859,328, Herzog et al. filed Sept. 19, 1969, describes and claims a drive wherein two or more synchronous motors are coupled directly to a single load and so adapted that they share the load between them. In a preferred embodiment of this invention employing two motors, each motor has a primary winding, i.e., an armature winding, which when energized with polyphase alternating current produces a synchronously rotating magnetic field, and a main field winding which when energized with direct current produces a steady state magnetic field that interacts with the rotating field so as to cause the rotor to rotate in synchronism with the rotating field. At least one of the motors has an auxiliary field winding located on the same magnetic core structure as the main field winding and displaced angularly with respect thereto. This winding is also energized with direct current and when so energized it produces a second steady state magnetic field having polar axes spaced angularly from the polar axes of the main field. These fields combine to produce a resultant greater than either one and situated on polar axes in between the first two sets of axes. The resultant field governs the point at which the rotor locks in step with the rotating field. To change this point, it is only necessary to change the direct current flowing in either one or both DC windings so that the polar axes of the resultant flux shifts angularly. By sensing the load on the motor and using the signal obtained as a guide, it is possible to set the relative values of the direct currents in the main and auxiliary windings so that the motor takes a specified proportion of the load.

This invention is directed to synchronous motors having an auxiliary winding adapted to serve two purposes: (1) to shift the DC field as described in the previous paragraph; and (2) to act as an AC secondary winding to provide torque during starting of the motor, i.e., start the motor as a wound rotor induction motor. A motor according to this invention has a primary or armature winding which when energized with polyphase alternating current produces a synchronously rotating magnetic field, a main field winding which when energized with direct current produces a steady state magnetic field that interacts with the rotating field so as to cause the rotor of the motor to rotate in synchronism with the rotating field, and an auxiliary field winding located on the same magnetic core structure as the main field winding. The auxiliary winding is distributed on the core in such a way in relation to the main field winding that when energized with direct current it produces alternate north and south magnetic poles having axes displaced angularly with respect to the axes of the magnetic poles of the main field, and during motor starting it serves as an AC secondary supplying current to a resistance to give the motor relatively high starting torque. A switching means connects the auxiliary winding to the resistance during motor starting, and once the pull-in speed is attained, i.e., nearly synchronous speed, it disconnects the resistance and connects the winding to a source of direct current. In effect the motor starts as a wound rotor induction motor and runs as a synchronous motor. Means are also provided for varying the excitation current in either one or both field windings so that the magnetic flux induced by the direct currents flowing in these windings combine into a resultant having polar axes which can be shifted relative to the core according to the respective current values.

The preferred use for synchronous motors embodying this invention will be in applications of two or more motors coupled to drive a common load that is to be shared between them. However, those skilled in the art will appreciate that there are other uses as well. Therefore, it is not the applicant's intention to limit the invention to a multi-motor drive as in the aforementioned application for patent.

A preferred embodiment of the invention will now be described with reference to the accompanying drawings, in which:

FIG. 2 is a diagram of a distributed auxiliary field winding;

FIG. 3 is a simple diagram showing a three-phase, Y connection of the winding of FIG. 2.

Figure 1:
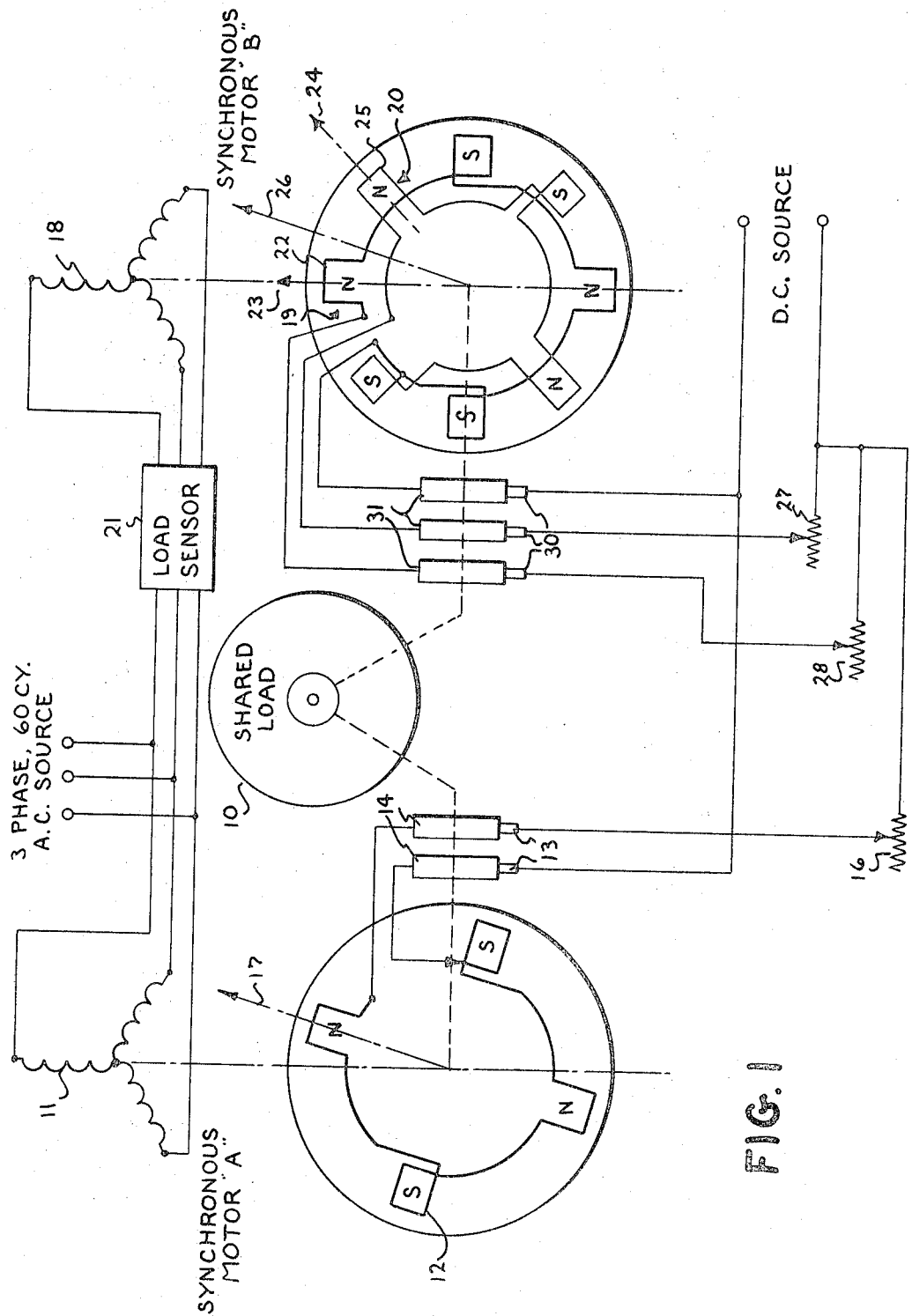
FIG. 1 illustrates diagrammatically two synchronous tors driving a common load.

FIG. 1 and the description of it is included for purposes of showing the relationship between the main and auxiliary field poles and to illustrate in a simple way how these fields combine to produce a resultant which can be shifted relative to the field core by changing the auxiliary and/or main field currents.

FIG. 1 illustrates diagrammatically two synchronous motors A and B coupled directly to a single load 10 so that both motors drive the load and share it between them according to the respective horsepower ratings of the motors. An example of such a drive is a large ore grinding mill driven by two synchronous motors, each of which has a pinion on its drive shaft meshing with a cogwheel on the mill drive shaft. Preferably, the two motors will have the same ratings, speeds, and operating characteristics, or as nearly so as they can be made. Different speed motors can, of course, be used with suitable gearing, but this tends to complicate the installation and will probably be little used.

Motor A is a conventional salient four pole synchronous motor which has a three phase AC armature winding 11 on its stator and a DC field winding 12 on its rotor. Winding 11 is connected to a three phase, 60 cycle, AC source, and when energized therefrom it produces a magnetic field which rotates at 60 cycle synchronous speed, in this case at 1800 r.p.m. The four pole field winding 12 is energized from a DC source by way of a pair of stationary brushes 13 in rubbing contact with a pair of slip rings 14 which rotate with the rotor and a rheostat 16 for adjusting the field current.

Motor B is shown as a salient four pole synchronous motor which has a three phase AC armature winding 18 on its stator and two DC field windings 19 and 20 on its rotor, of which winding 19 is the main field winding corresponding with winding 12 and winding 20 is an auxiliary field winding displaced angularly with respect to the main field winding. The purpose and function of auxiilary winding 20 will be described later. Winding 18 is conected to a three phase, 60 cycle, AC source, and when energized therefrom it produces a magnetic field which rotates at 60 cycles synchronous speed, as in the case of motor A at 1800 r.p.m. The power that motor B draws from the AC source is measured by means of a load sensor 21 connected in the line to winding 18. Sensor 21 may be a wattmeter, ammeter or some similar device which senses the power input to the motor and therefore its output loading, or the share of load 10 taken by the motor.

The main field structure of motor B consists of a winding 19 having four field coils on four pole bodies which are spaced around the rotor core at 90 degree intervals. This is like the field structure of motor A. When energized with direct current, this winding produces a steady state magnetic field having the magnetic axes of the alternate north and south poles at 90 degrees in space or 180 electrical degrees. Arrow 23 represents the direction and magnitude of the magnetic field of the upper north pole 22 and will be referred to hereinafter as its polar axis. The auxiliary winding 20 is also a four pole winding wherein the respective field coils are located with their coils axes between the axes of the coils of winding 19. FIG. 1 shows an alternate arrangement of main and auxiliary poles with the auxiliary poles spaced 90 degrees apart and in quadrature with the main poles. When energized with direct current, the auxiliary winding produces another steady state magnetic field of alternate north and south poles displaced angularly with respect to the main poles. Arrow 24 represents the direction and magnitude of the magnetic field of the north pole 25 immediately to the right of main pole 22 and will be referred to hereinafter as its polar axis. When combined, fields 23 and 24 give a resultant field 26 located somewhere between poles 22 and 25 and of greater magnitude than either 23 or 24.

Four purposes of this discussion, polar axis 26 represents the point at which the rotor of motor B locks in step with the rotating field from armature winding 18, and polar axis 17 represents the point at which the rotor of motor A locks in step with the rotating field from armature winding 11. Axis 17 is fixed in position relative to the rotor of motor A, but axis 26 is not fixed relative to the rotor of motor B. Axis 26 can be moved relative to the rotor of motor B by adjusting the direct currents flowing in either one or both of windings 19 and 20. Advancing axis 26 in the direction of rotation causes motor B to decrease its share of load 10, and retarding the axis causes the motor to increase its share of the load. The load on motor B can be determined by sensor 21 and if it is not the proper share of load 10, it can be reset to the proper value by changing the auxiliary and/or main field currents, as for example, by a suitable adjustment to rheostats 27 and 28 in the external DC supply for the windings. The external DC source is connected to the windings by way of rheostats 27 and 28 and the three stationary brushes 30 in rubbing contact with the three slip rings 31 mounted on the rotor shaft for rotation therewith.

FIG. 1 shows one motor A which cannot be adjusted for load sharing and another motor B which can be adjusted. This is the simplest arrangement of the two motor concept. Motor A may be made like motor B, that is, both have fields that can be adjusted for load sharing purposes.

FIG. 2 illustrates a wave winding distributed over the pole faces of a salient pole rotor for a synchronous motor. According to the invention, this winding can be connected as a secondary for use with resistors to give the motor relatively high starting torque, or it can be connected to a source of direct current to provide an auxiliary magnetic field displaced with respect to the main field. This figure shows three salient poles of a multi pole rotor for a synchronous motor which has its AC winding on the stator as in FIG. 1. Each one of the poles 32, 33, 34, etc. carries a main field coil 35 around its body 36 under an overhanging head 37. Each pole head 37 contains six axially directed slots 38 to 43 extending radially inward from its face 44 in spaced relations. This is best illustrated in FIGS. 2(a) and (c). These slots contain the auxiliary winding 45 now to be described.

Winding 45 is illustrated in FIGS. 2(a) and (d) as a conventional wave winding of two coil sides per slot. In practice each coil such as 46 or 47 will consist of a plurality of insulated conductor turns formed into a coil having two sides located in corresponding slots of adjacent poles and end heads projecting axially from the pole heads. This is best illustrated in connection with coil 46 which is shown with one side 48 in the top half of slot 38 of pole 32 and the other side 49 in the bottom half of slot 38 of pole 33. The next coil 46 to the right also spans one pole pitch, extending from the top half of slot 38 of pole 33 to the bottom half of slot 38 of pole 34. There is one such coil 46 for each pole, and it extends from a slot 38 in one pole to a corresponding slot in the next pole, i.e., the span of each coil is equal to one pole pitch. Coils 46 progress to the right around the pole structure to form a ring of coils which begins with side 48 of the first coil in the top half of slot 38 of pole 32 and ends with side 49 of the last coil in the bottom half of slot 38 of pole 32. The adjacent coils 47 are identical to coils 46, and progress around the rotor in the same way in the next slots 39 to the right so as to form another ring of coils around the pole structure. Coils 46 and 47 are connected together in the proper sequence as one phase of a three phase winding such as phase $a$ shown in FIG. 3. The next set of coils, 50, 51 are the same as coils 46, 47 and are located around the core structure in the same way in slots 40 and 41 respectively. They are connected together as phase $c$ of FIG. 3. The third set of coils 52, 53 which occupy slots 42 and 43 respectively comprise phase $b$.

This arrangement of the coils results in a three-phase, Y connected winding as shown in FIG. 3. To give the motor relatively high starting torque the output terminal 54, 55 and 56 of winding 45 are connected to a resistance during motor starting. When the rotor attains nearly synchronous speed the main field current is applied to bring the motor into synchronism, and terminals 54, 55 and 56 are then disconnected from the resistance and terminals 55 and 56 connected to a DC source so that phases $c$ and $b$ now become the auxiliary field winding which induces a magnetic field such as illustrated by the MMF diagram of FIG. 2(b). In this diagram, rectangles 57 to 60 are plotted on base line 61 to represent the north fields induced by coils 50 to 53 respectively on poles 32 and 33, and the rectangles 62 to 65 are plotted on the same base line to represent the south field induced by the same coils on poles 33 and 34. The sum of these is represented by the heavy line 66 which approximates a sine wave having its zero points on line 61. The portions of this graph above line 61 represent north magnetic fields and those below south magnetic fields. Field portion 66 induced by direct current flowing in the auxiliary winding on poles 32 and 33 has a north polar axis 67 which is displaced by an angle $\phi$ to the left from the north polar axis 68 of the field induced in pole 33 by the direct current flowing in its main field coil 35. There is of course, an auxiliary field pole for each main poled displaced therefrom in the same direction and by equal amounts. The main and auxiliary fields combine to produce a resultant field which has alternate north and south polar axes lying somewhere between the main and auxiliary axes, i.e., between axes 67 and 68. The position and magnitude of the resultant depends on the magnitudes of the main and auxiliary fields, or, in other words, on the relative values of the two field currents. Since the resultant axes represent the point at which the rotor locks in step with the synchronously rotating armature field, it is therefore possible to alter this point by adjusting the field currents and make one or more motors of a plurality of motors driving a common load increase or decrease load so that the motors are forced to share the load as already discussed in connection with FIG. 1.

Those skilled in the art of synchronous motors will appreciate that an auxiliary winding such as 45 can be distributed in slots in the pole heads in a number of ways and that the number of slots used will depend on machine design. It is important, however, that the arrangement of the coils in the winding be such that the winding can be made to serve as an AC secondary for motor starting and as an auxiliary DC field for shifting the position of the main field relative to the field core structure during synchronous motor running.

Figure 4:
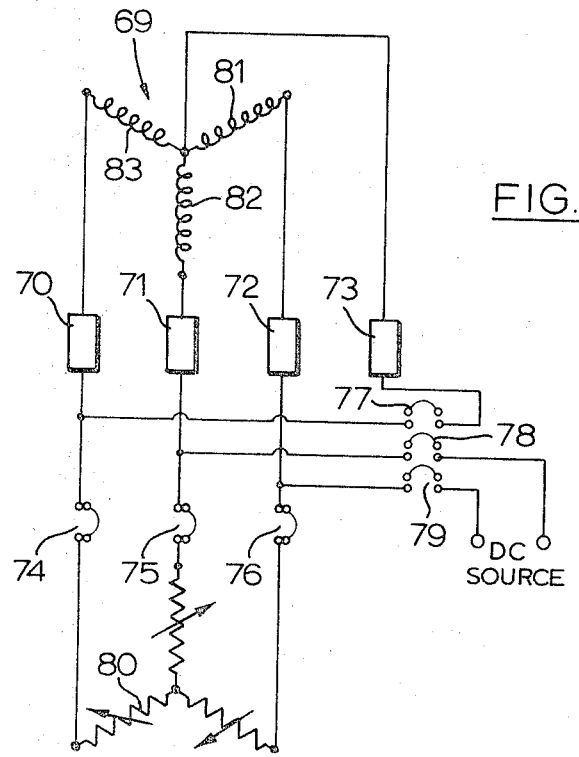
FIGS. 4, 5, and 6 are simple diagrams of the auxiliary windings and their connections with external circuits.
Figure 5:
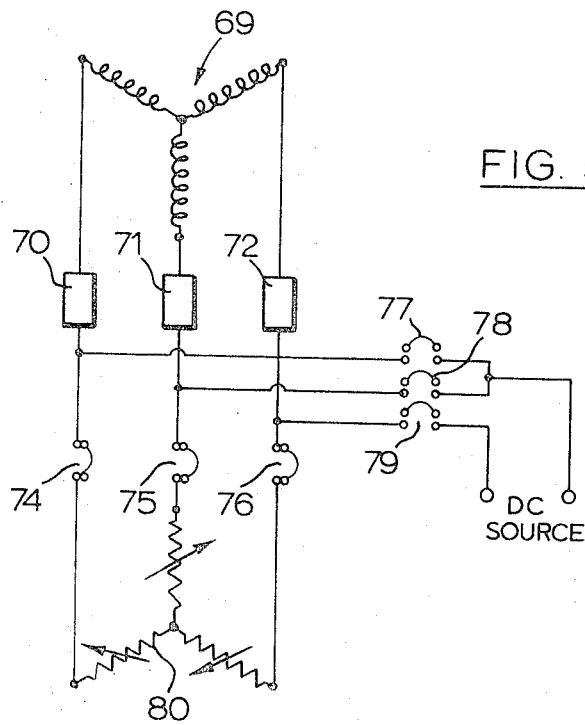
Figure 6:
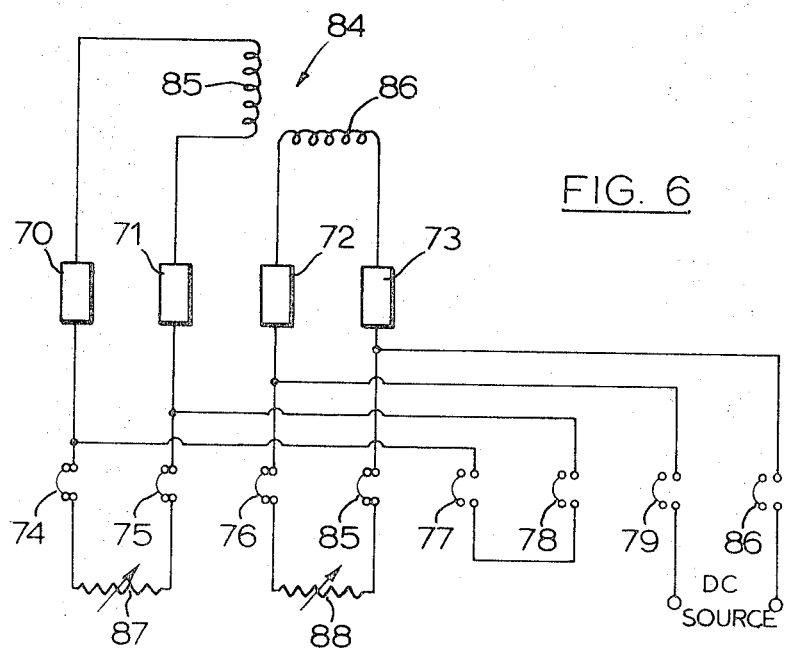

A number of ways for connecting a winding such as 45 to a starting resistor and a DC source will now be considered with reference to FIGS. 4 to 6. All three figures show the auxiliary winding only and the current collectors on the rotor for connecting this winding to the external circuits. The main field winding, which is also on the rotor, is not shown, nor are the current collectors for connecting it to a resistor during motor starting and to a DC source during synchronous operation.

FIG. 4 shows an auxiliary winding 69, current collectors 70 to 73, contacts 74 to 79 of a magnetic contactor, an adjustable resistor 80, and a source of direct current. Winding 69 is on the rotor of the motor with the main field winding, and it is connected to the external circuit components 74 to 80 by way of the current collectors 70 to 73, e.g., slip rings mounted on the rotor shaft and connected to the winding, and stationary brushes bearing on the rings and connected to the external components. Contacts 74, 75 and 76 are normally closed and contacts 77, 78, and 79 are normally open. These are the positions of the contacts at all times except when the motor is operating at synchronous speed, at which time the positions are reversed. The two sets of contacts are interlocked so that one set is closed while the other is open and vice versa. During starting, winding 69 is connected as a three-phase, Y circuit and this circuit is connected to the adjustable resistor 80 so that the motor starts as a wound rotor induction motor under the control of the resistor. When the speed of the rotor reach the point where the rotor will pull into step with the synchronously rotating primary field, the main field coils are energized with direct current, and when in synchronism, the contactor opens its contacts 74, 75, and 76 and closes its contacts 77, 78, and 79. This switching operation disconnects the resistor, connects two phases 81 and 82 of the three phase winding to the direct current source as in FIG. 3, and short circuits the third phase 83. As is the FIGS. 2 and 3 circuits, windings 81 and 82 provide the adjustable auxiliary field flux which is combined with the main field flux for purpose of shifting the resultant flux with respect to the rotor, or shifting the point at which the rotor locks in step with the synchronously rotating primary flux. The short circuit on the remaining phase winding 83 converts it into a stabilizing winding which serves essentially the same purpose as a conventional amortisseur winding does during synchronous operation.

FIG. 5 shows the same auxiliary winding 69 connected to the DC source in a different way. In this arrangement, two of the phase windings are connected in parallel and the parallel combinations in series with the third phase winding. Starting is the same as in FIG. 4, but during synchronous operation the series-parallel combination is connected to the DC source.

FIGS. 3, 4, and 5 show the auxiliary winding connected as a three-phase winding for starting purposes. Although the primary of the motor is three phase, it is possible to connect the auxiliary winding other than three phase, for example, two phase. A number of two phase connections are possible, one of which is illustrated in FIG. 6. In FIG. 6, the auxiliary winding 84 has two phase windings 85 and 86 connected to resistors 87 and 88 respectively for starting; winding 86 is connected to the DC source and winding 85 short circuited for running. Both windings may be connected to the DC source or interconnect so that only three current collectors are needed.

Manual or automatic means will be employed with the motor of this invention for starting it on the auxiliary field winding and then operating it with the auxiliary winding energized with direct current. For optimum motor operation, it will be necessary to control the value of the auxiliary field current in relation to the main field current. This along with the starting procedure will best be done with an automatic control system. A system found suitable for this purpose is described and claimed in the applicant's application for patent, Ser. No. 859,329, filed Sept. 19, 1969, Herzog et al.

It is well known to connect a resistor across the main field winding of a conventional synchronous motor during starting thereof for purposes of providing the motor with starting torque. Motors constructed according to this invention may also make use of the main field winding to supply starting torque. When this is done, the main field winding is connected to a resistor during starting and once the motor is at its pull-in speed, the resistor is disconnected and direct current is applied to the winding. The operation of the motor then becomes synchronous.

The embodiments of the invention in which an exclusive property or privilege is claimed are defined as follows:

1. A synchronous motor comprising a stator and a rotor, one of which has an armature core and the other a field core; an armature winding on said armature core for producing a rotating magnetic field when energized with alternating current; a main field winding on said field core for producing a multi-polar steady state magnetic field when energized with direct current; an auxiliary winding on said field core displaced with respect to said main winding such that when energized with direct current it produces a second multi-polar steady state magnetic field having polar axes displaced with respect to the polar axes of said main field and when connected to resistor means it provides secondary winding turns for said armature winding; means for connecting said auxiliary winding to a direct current source or to said resistor means; and means for varying the relative values of the direct current applied to said main and auxiliary windings.

2. A synchronous motor comprising a stator having an armature core with an air gap defining surface thereon and an armature winding on the core, said winding producing a synchronously rotating magnetic field when energized with poly phase alternating current; a rotor having a field core including a plurality of spaced pole bodies, a pole head on each body, and a pole face on each head spaced from said surface and defining therewith the air gap between the armature and field cores; pole face slots in said pole heads; a main field winding on said pole bodies, when energized with direct current said main field winding producing alternate north and south magnetic poles at the pole faces; an auxiliary winding consisting of a plurality of coils distributed in said slots with one side of each coil on one pole head and the other side on an adjacent pole head, said coils being interconnected in a configuration adapted to provide a secondary winding for said armature winding or produce an auxiliary field of alternate north and south magnetic poles located between the respective north and south main poles when at least a portion of said coil configuration is energized with direct current; a motor starting resistor for said auxiliary winding; switching means for connecting said auxiliary winding to said resistor for motor starting, or connecting said coil configuration portion to a direct current source for synchronous motor operation; and means for varying the relative values of the direct current applied to said main field winding and to said coil configuration portion.

3. The synchronous motor of claim 2 wherein said armature winding is a three-phase winding.

4. The synchronous motor of claim 3 wherein said auxiliary winding is a three-phase, Y connected winding distributed over the pole heads in a plurality of slots equally spaced in each head.

5. The synchronous motor of claim 3 wherein said coil configuration portion consists of two phase windings of said three-phase auxiliary winding said two phase windings being connected in series and the series combination adapted to be connected to the direct current source by means of said switching means during synchronous motor operation.

6. The synchronous motor of claim 5 wherein the third phase of said auxiliary winding is adapted to be short circuited by means of said switching means during synchronous motor operation.

7. The synchronous motor of claim 3 wherein said coil configuration portion consists of all three phase windings of said auxiliary winding, two of said phase windings being connected in parallel, the parallel combination in series with the third phase winding, and the final combination adapted to be connected to the direct current source by means of said switching means during synchronous motor operation.

8. The synchronous motor of claim 5, wherein said starting resistor is a variable resistor for connection to the output terminals of said Y connected auxiliary winding by means of said switching means during motor starting.

9. The synchronous motor of claim 2 wherein said auxiliary winding is a two-phase winding.

10. The synchronous motor of claim 1 coupled with at least one other like motor to drive a common load for load sharing between the motors by adjustment of said relative values of the direct currents.

11. The synchronous motor of claim 1 coupled with a synchronous motor to drive a common load.

12. The synchronous motor of claim 1 wherein said field core is on the rotor and is of non salient pole construction.

13. The synchronous motor of claim 1 including resistor means for said main field winding and means for connecting the winding to the resistor or to a direct current source.

References Cited

UNITED STATES PATENTS 2,255,490   9/1941   Lauder _____ 318—181

ORIS L. RADER, Primary Examiner

G. Z. RUBINSON, Assistant Examiner

UNITED STATES PATENT OFFICE
CERTIFICATE OF CORRECTION

Patent No. 3,553,552          Dated January 5, 1971

Inventor(s)    GORDON WILLIAM HERZOG

It is certified that error appears in the above-identified patent and that said Letters Patent are hereby corrected as shown below:

Column 6, line 24, delete "A system found suit-"
Column 6, delete lines 25 thru 27, inclusive.

Signed and sealed this 4th day of January 1972.

(SEAL)
Attest:

EDWARD M. FLETCHER, JR.          ROBERT GOTTSCHALK
Attesting Officer                Acting Commissioner of Pate